(12) United States Patent
Tour et al.

(10) Patent No.: US 10,403,894 B2
(45) Date of Patent: Sep. 3, 2019

(54) VERTICALLY ALIGNED CARBON NANOTUBE ARRAYS AS ELECTRODES

(71) Applicant: William Marsh Rice University, Houston, TX (US)

(72) Inventors: James M. Tour, Bellaire, TX (US); Abdul-Rahman O. Raji, Houston, TX (US); Rodrigo V. Salvatierra, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 101 days.

(21) Appl. No.: 15/568,186

(22) PCT Filed: Apr. 25, 2016

(86) PCT No.: PCT/US2016/029184
§ 371 (c)(1),
(2) Date: Oct. 20, 2017

(87) PCT Pub. No.: WO2017/011052
PCT Pub. Date: Jan. 19, 2017

(65) Prior Publication Data
US 2018/0358618 A1    Dec. 13, 2018

Related U.S. Application Data

(60) Provisional application No. 62/151,941, filed on Apr. 23, 2015.

(51) Int. Cl.
*H01M 4/58* (2010.01)
*H01M 10/05* (2010.01)
(Continued)

(52) U.S. Cl.
CPC ............ *H01M 4/587* (2013.01); *H01G 11/28* (2013.01); *H01G 11/36* (2013.01); *H01G 11/68* (2013.01);
(Continued)

(58) Field of Classification Search
None
See application file for complete search history.

(56) References Cited

U.S. PATENT DOCUMENTS 8,709,373 B2    4/2014   Hauge et al.
9,455,094 B2    9/2016   Tour et al.
(Continued)

FOREIGN PATENT DOCUMENTS

CN          1910771 A       2/2007
WO     WO-2016201101 A1    12/2016
(Continued)

OTHER PUBLICATIONS

China National Intellectual Property Administration, Notice on the First Office Action, Application No. 201680037047.2.
(Continued)

*Primary Examiner* — Scott J. Chmielecki
(74) *Attorney, Agent, or Firm* — Winstead PC

(57) ABSTRACT

Embodiments of the present disclosure pertain to electrodes that include a plurality of vertically aligned carbon nanotubes and a metal associated with the vertically aligned carbon nanotubes. The vertically aligned carbon nanotubes may be in the form of a graphene-carbon nanotube hybrid material that includes a graphene film covalently linked to the vertically aligned carbon nanotubes. The metal may become reversibly associated with the carbon nanotubes in situ during electrode operation and lack any dendrites or mossy aggregates. The metal may be in the form of a non-dendritic or non-mossy coating on surfaces of the
(Continued)

vertically aligned carbon nanotubes. The metal may also be infiltrated within bundles of the vertically aligned carbon nanotubes. Additional embodiments pertain to energy storage devices that contain the electrodes of the present disclosure. Further embodiments pertain to methods of forming said electrodes by applying a metal to a plurality of vertically aligned carbon nanotubes.

25 Claims, 16 Drawing Sheets

(51) Int. Cl.
| | |
|---|---|
| H01M 4/587 | (2010.01) |
| H01M 4/04 | (2006.01) |
| H01M 4/62 | (2006.01) |
| H01M 4/66 | (2006.01) |
| H01M 10/0525 | (2010.01) |
| H01G 11/28 | (2013.01) |
| H01G 11/36 | (2013.01) |
| H01G 11/68 | (2013.01) |
| H01G 11/86 | (2013.01) |
| H01M 4/36 | (2006.01) |
| H01M 4/38 | (2006.01) |
| H01M 10/052 | (2010.01) |
| H01G 11/06 | (2013.01) |
| H01M 4/02 | (2006.01) |

(52) U.S. Cl.
CPC ............ *H01G 11/86* (2013.01); *H01M 4/045* (2013.01); *H01M 4/366* (2013.01); *H01M 4/382* (2013.01); *H01M 4/625* (2013.01); *H01M 4/66* (2013.01); *H01M 4/661* (2013.01); *H01M 4/663* (2013.01); *H01M 10/052* (2013.01); *H01M 10/0525* (2013.01); *H01G 11/06* (2013.01); *H01M 2004/027* (2013.01); *Y02E 60/13* (2013.01)

(56) References Cited

U.S. PATENT DOCUMENTS

| | | | | |
|---|---|---|---|---|
| 2004/0175621 | A1* | 9/2004 | Iriyama | H01M 4/134 429/231.95 |
| 2010/0216027 | A1* | 8/2010 | Fujii | H01G 9/016 429/246 |
| 2012/0076974 | A1 | 3/2012 | Strauss et al. | |
| 2012/0107582 | A1 | 5/2012 | Metz et al. | |
| 2012/0145997 | A1 | 6/2012 | Hauge et al. | |
| 2014/0313636 | A1 | 10/2014 | Tour et al. | |
| 2014/0315100 | A1* | 10/2014 | Wang | H01M 4/366 429/319 |
| 2018/0175379 | A1 | 6/2018 | Tour et al. | |
| 2018/0183041 | A1 | 6/2018 | Tour et al. | |

FOREIGN PATENT DOCUMENTS

| | | |
|---|---|---|
| WO | WO-2017034650 A2 | 3/2017 |
| WO | WO-2017062950 A1 | 4/2017 |
| WO | WO-2017164963 A2 | 9/2017 |

OTHER PUBLICATIONS

International Search Report and Written Opinion for PCT/US16/29184, dated Dec. 30, 2016.
Zhu, Y., Li, L, Zhang, C., Castillas, G., Sun, Z., Yan, Z., Ruan, G., Peng, Z., Raji, A.-R. O., Kittrell, C., Hauge, R. H. & Tour, J. M. A seamless three-dimensional carbon nanotube graphene hybrid material. *Nature Commun.* 3, 1225 (2012).
Lin, J.; Zhang, C.; Yan, Z.; Zhu, Y.; Peng, Z.; Hauge, R. H.; Natelson, D.; Tour, J. M. "3-Dimensional Graphene Carbon Nanotube Carpet-Based Microsupercapacitors with High Electrochemical Performance," *Nano Lett.* 2013, 13, 72-78. DOI: 10.1021/nl3034976.
Sun, Z.; Raji, A.-R. O.; Zhu, Y.; Xiang, C.; Yang, C.; Kittrell, C.; Samuel, E. L.; Tour, J. M. Large-Area Bernal-Stacked Bi-, Tri-, and Tetralayer Graphene. ACS Nano 2012, 6, 9790-9796.
Yan, Y.; Ma, L.; Zhu, Y.; Lahiri, I.; Hahm, M. G.; Liu, L.; Yang, S.; Xiang, C.; Lu, W.; Peng, Z.; Sun, Z.; Kittrell, C.; Lou, J.; Choi, W.; Ajayan, P. M.; Tour, J. M. "Three-Dimensional Metal Graphene Nanotube Multifunctional Hybrid Materials," *ACS Nano* 2013, 7, 58-64. DOI: 10.1021/nn3015882.
Bouchet. R. A stable lithium metal interface. *Nature Nanotechnol.* 9, 572-573 (2014).
Evarts, E. C. Lithium batteries: To the limits of lithium. *Nature* 526, S93-S95 (2015).
Aurbach, D., Zinigrad, E., Cohen, Y. & Teller, H. A short review of failure mechanisms of lithium metal and lithiated graphite anodes in liquid electrolyte solutions. *Solid State Ion.* 148, 405-416 (2002).
Hirai, T., Yoshimatsu, I. & Yamaki, J-I. Effect of additives on lithium cycling efficiency. *J. Electrochem. Soc.* 141, 2300-2305 (1994).
Crowther, O. & West, A. C. Effect of electrolyte composition on lithium dendrite growth. *J. Electrochem. Soc.* 155, A806-A811 (2008).
Tung, S.-O., Ho, S., Yang, M., Zhang, R. & Kotov, N. A. A dendrite-suppressing composite ion conductor from aramid nanofibers. *Nature Commun.* 6, 6152 (2015).
Zheng, G., Lee, S. W., Liang, Z., Lee, H.-W., Yan, K., Yao, H., Wang, H., Li, W., Chu, S. & Cui, Y. Interconnected hollow carbon nanospheres for stable Li metal anodes. *Nature Nanotechnol.* 9, 618-623 (2014).
Aurbach, D., Zinigrad, E., Teller, H., Dan, P. Factors which limit the cycle life of rechargeable lithium (metal) batteries. *J. Electrochem. Soc.* 147, 1274-1279 (2000).
Yang, C.-P., Yin, Y.-X., Zhang, S.-F., Li, N.-W. & Guo, Y.-G. Accommodating lithium into 3D current collectors with a submicron skeleton towards long-life lithium metal anodes. *Nature Commun.* 6, 8058 (2015).
Tans, S. J., Devoret, M. H., Dai, H., Thess, A., Smalley, R. E., Georliga, L. J. & Dekker, C. Individual single-wall carbon nanotubes as quantum wires. *Nature* 386, 474-477 (1997).
Claye, A. S., Fischer, J. E., Huffman, C. B., Rinzler, A. G. & Smalley, R. E. Solid-state electrochemistry of the Li single wall carbon nanotube system. *J. Electrochem. Soc.* 147, 2845-2852 (2000).
Kumar, T. P., Kumari, T. S. D. & Stephan, A. M. Carbonaceous anode materials for lithium-ion batteries—the road ahead. *J. Indian Inst. Sci.* 89, 394-424 (2009).
Shimoda, H., Gao, B., Tang, X. P., Kleinhammes, A., Fleming, L., Wu, Y. & Zhou, O. Lithium intercalation into opened single-wall carbon nanotubes: Storage capacity and electronic properties. *Phys. Rev. Lett.* 88, 015502 (2002).
Landi, B. J., Ganter, M. J., Schauerman, C. M., Cress, C. D. & Raffaele, R. P. Lithium ion capacity of single wall carbon nanotube paper electrodes. *J. Phys. Chem.* C112, 7509-7515 (2008).
Roy, P. & Srivastava, S. K. Nanostructured anode materials for lithium ion batteries. *J. Mater. Chem. A* 3, 2454-2484 (2015).
Lu, Y., Tu, Z. & Archer, L. A. Stable lithium electrodeposition in liquid and nanoporous solid electrolytes. *Nature Mater.* 13, 961-969 (2014).
Zhang, H.; Yu, X. & Braun, P. V. Three-dimensional bicontinuous ultrafast-charge and -discharge bulk battery electrodes. *Nature Nanotechnol.* 6, 277-281 (2011).
Garau, C., Frontera, A., Quinonero, D., Costa, A., Ballester, P. & Deya, P. M. Ab initio investigations of lithium diffusion in single-walled carbon nanotubes. *Chem. Phys.* 297, 85-91 (2004).
Xing, W., Dunlap, R. A. & Dahn, J. R. Studies of lithium insertion in ballmilled sugar carbons. *J. Electrochem. Soc.* 145, 62-70 (1998).
Gao, B., Bower, C., Lorentzen, J. D., Fleming, L., Kleinhammes, A., Tang, X. P., McNeil, L. E., Wu, Y. & Zhou, O. Enhanced saturation lithium composition in ball-milled single-walled carbon nanotubes. *Chem. Phys. Lett.* 327, 69-75 (2000).

(56) References Cited

OTHER PUBLICATIONS

Carter, R., Oakes, L., Cohn, A. P., Holzgrafe, J., Zarick, H. F., Chatterjee, S., Bardhan, R. & Pint, C. L. Solution assembled single-walled carbon nanotube foams: Superior performance in supercapacitors, lithium-ion, and lithium-air batteries. *J. Phys. Chem. C* 118, 20137-20151 (2014).

International Preliminary Report on Patentability for PCT/US2016/29184, dated Nov. 2, 2017.

* cited by examiner

VERTICALLY ALIGNED CARBON NANOTUBE ARRAYS AS ELECTRODES

CROSS-REFERENCE TO RELATED APPLICATIONS

This application claims priority to U.S. Provisional Patent Application No. 62/151,941, filed on Apr. 23, 2015. The entirety of the aforementioned application is incorporated herein by reference.

STATEMENT REGARDING FEDERALLY SPONSORED RESEARCH

This invention was made with government support under Grant No. FA9550-12-1-0035, awarded by the U.S. Department of Defense; and Grant No. FA9550-14-1-0111, awarded by the U.S. Department of Defense. The government has certain rights in the invention.

BACKGROUND

Current electrodes suffer from numerous limitations, including limited metal storage capacities, and the formation of dendritic materials during operation. Various aspects of the present disclosure address the aforementioned limitations.

SUMMARY

In some embodiments, the present disclosure pertains to electrodes that include a plurality of vertically aligned carbon nanotubes and a metal associated with the vertically aligned carbon nanotubes. In some embodiments, the vertically aligned carbon nanotubes include vertically aligned single-walled carbon nanotubes that are in the form of an array. In some embodiments, the vertically aligned carbon nanotubes are associated with a substrate. In some embodiments, the substrate serves as a current collector. In some embodiments, the vertically aligned carbon nanotubes and the substrate serve as a current collector.

In some embodiments, the vertically aligned carbon nanotubes are in the form of a graphene-carbon nanotube hybrid material, where the vertically aligned carbon nanotubes are covalently linked to the graphene film through carbon-carbon bonds at one or more junctions between the carbon nanotubes and the graphene film. In some embodiments, the graphene film is also associated with a substrate, such as a copper or nickel substrate.

The vertically aligned carbon nanotubes of the present disclosure may be associated with various metals. For instance, in some embodiments, the metal includes, without limitation, alkali metals, alkaline earth metals, transition metals, post transition metals, rare-earth metals, and combinations thereof. In some embodiments, the metal includes, without limitation, Li, Na, K, Mg, Ca, Ti, V, Cr, Mn, Fe, Co, Ni, Cu, Zn, Al, Sn, Sb, Pb, and combinations thereof. In some embodiments, the metal includes lithium.

In some embodiments, the metal becomes reversibly associated with the vertically aligned carbon nanotubes in situ during electrode operation. In some embodiments, the metal associated with the vertically aligned carbon nanotubes lacks any dendrites or aggregates (e.g., mossy aggregates). In some embodiments, the metal is in the form of a non-dendritic or non-mossy coating on surfaces of the vertically aligned carbon nanotubes. In some embodiments, the metal is infiltrated within bundles of the vertically aligned carbon nanotubes.

In some embodiments, the vertically aligned carbon nanotubes serve as the active layer of the electrode. In some embodiments, the metals serve as the active layer of the electrode while the vertically aligned carbon nanotubes serve as a current collector (either alone or in conjunction with a substrate). In some embodiments, the electrode is an anode or a cathode. In some embodiments, the electrode is a component of an energy storage device, such as a lithium-ion battery or a lithium-ion capacitor.

Additional embodiments of the present disclosure pertain to energy storage devices that contain the electrodes of the present disclosure. Further embodiments of the present disclosure pertain to methods of forming the electrodes of the present disclosure.

DESCRIPTION OF THE FIGURES

FIG. 2 illustrates the growth and structural characterization of graphene-carbon nanotube hybrid materials (GCNTs).

FIG. 4 provides electrochemical characteristics of GCNT-Li anodes.

FIG. 8 compares the electrochemical characteristics of GCNT-based anodes with horizontal CNT-based anodes.

FIG. 11 shows the electrochemical characteristics of prelithiated GCNTs.

DETAILED DESCRIPTION

Figure 1A:
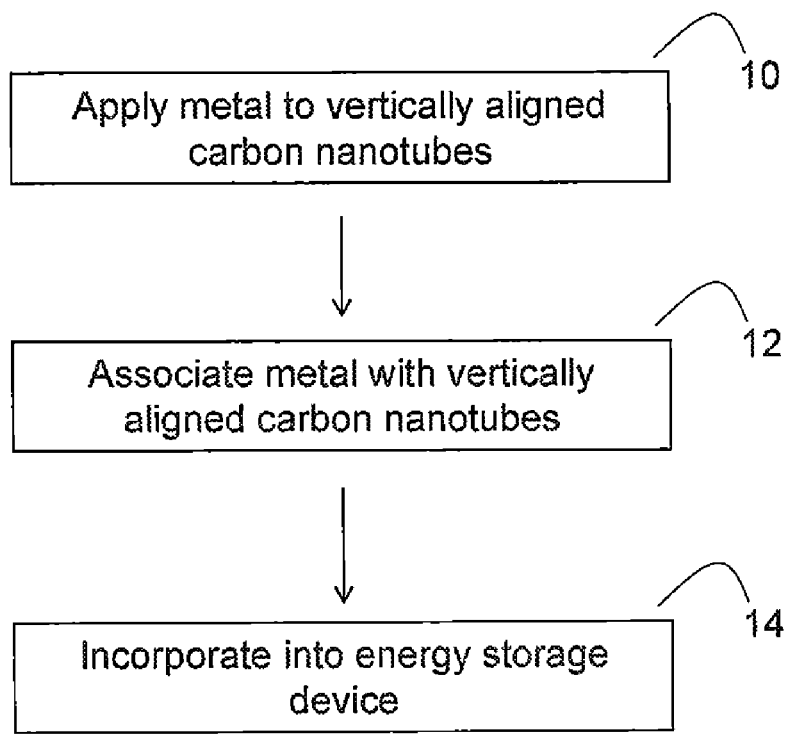
FIG. 1 illustrates the formation of electrodes (FIG. 1A), a structure of a formed electrode (FIG. 1B), and the use of the formed electrodes in a battery (FIG. 1C).

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Due to the increased use of energy storage devices in various electronics, there has been a need for the development of energy storage devices with high power densities, high energy densities, and fast charge/discharge rates. For instance, lithium-ion batteries have been utilized as energy storage devices due to their high energy and power capabilities.

In particular, lithium-ion batteries contain high capacity lithium host materials that serve as anodes. Such host materials can include silicon, tin, graphite, and transition metal compounds (e.g., iron oxide). Generally, lithium ions intercalate into the host materials to form an alloy. The lithium ions can also become integrated into the host materials by a conversion reaction.

However, the theoretical capacity of lithium ion batteries is limited by the amount of lithium that can be stored in or reacted with the host materials. For instance, the theoretical capacity of lithium-ion batteries that contain graphite-based anodes is limited to about 372 mAh/g. Likewise, the theoretical capacity of lithium-ion batteries that contain iron oxide-based anodes is limited to about 1,007 mAh/g. Similarly, the theoretical capacity of lithium-ion batteries that contain silicon-based anodes is limited to about 3,579 mAh/g.

Furthermore, major safety concerns exist when lithium is utilized as an anode component in lithium ion batteries and other energy storage devices. In particular, safety hazard issues arise due to the formation of dendritic and related structures by the lithium ions, especially at high current densities. Such dendritic structures are usually non-uniform crystals that grow in the form of fiber-like, needle-like, moss-like, or tree-like structures.

The dendritic structures can generate significant volume expansion during cycling. The volume expansions can in turn diminish an energy storage device's coulombic efficiency and cycle life by blocking the separator pores and inducing continuous electrolyte decomposition. Such effects can in turn lead to internal short circuits. This is especially dangerous because of the presence of organic solvent components in batteries.

Various approaches have been utilized to address issues arising from dendritic growth in energy storage devices. Such approaches have included: (a) new additives and electrolyte salt/solvent combinations to enable formation of a strong and stable solid electrolyte interphase (SEI); (b) coating the electrode with a mechanically strong porous polymer, solid membrane, or ionic conductor as a separator in order to suppress or prevent dendritic growth and penetration; and (c) forming a protective shell on the current collector to encapsulate the lithium and prevent dendritic growth. However, since dendrite formation is more rapid and severe at higher current densities, the aforementioned approaches can limit lithium storage capacity per unit electrode area and cycle life. For the same reasons, the aforementioned approaches can restrict electrode current density.

As such, a need exists for electrodes that exhibit optimal metal storage capacities and minimal dendrite formation. Various aspects of the present disclosure address this need.

In some embodiments, the present disclosure pertains to methods of making electrodes that contain vertically aligned carbon nanotubes. In some embodiments illustrated in FIG. 1A, the methods of the present disclosure include applying a metal to a plurality of vertically aligned carbon nanotubes (step 10) such that the metal becomes associated with the vertically aligned carbon nanotubes (step 12). In some embodiments, the methods of the present disclosure also include a step of incorporating the formed electrode as a component of an energy storage device (step 14).

In additional embodiments, the present disclosure pertains to the formed electrodes. In some embodiments, the electrodes of the present disclosure include a plurality of vertically aligned carbon nanotubes and a metal that is associated with the vertically aligned carbon nanotubes. In more specific embodiments illustrated in FIG. 1B, the electrodes of the present disclosure can be in the form of electrode 30, which includes metal 32, vertically aligned carbon nanotubes 34, graphene film 38, and substrate 40. In this embodiment, vertically aligned carbon nanotubes 34 are in the form of array 35. The vertically aligned carbon nanotubes are covalently linked to graphene film 38 through seamless junctions 36. In addition, metal 32 is associated with vertically aligned carbon nanotubes 34 in the form of non-dendritic or non-mossy films.

Further embodiments of the present disclosure pertain to energy storage devices that contain the electrodes of the present disclosure. For instance, as illustrated in FIG. 1C, the electrodes of the present disclosure can be utilized as components of battery 50, which contains cathode 52, anode 56, and electrolytes 54. In this embodiment, the electrodes of the present disclosure can serve as cathode 52 or anode 56.

As set forth in more detail herein, the present disclosure can utilize various types of vertically aligned carbon nanotubes. Moreover, various metals may be associated with the vertically aligned carbon nanotubes in various manners. Furthermore, the electrodes of the present disclosure can be utilized as components of various energy storage devices.

Vertically Aligned Carbon Nanotubes

The electrodes of the present disclosure can include various types of vertically aligned carbon nanotubes. For instance, in some embodiments, the vertically aligned carbon nanotubes include, without limitation, single-walled carbon nanotubes, double-walled carbon nanotubes, triple-walled carbon nanotubes, multi-walled carbon nanotubes, ultra-short carbon nanotubes, small diameter carbon nanotubes, pristine carbon nanotubes, functionalized carbon nanotubes, and combinations thereof. In some embodiments, the vertically aligned carbon nanotubes include vertically aligned single-walled carbon nanotubes.

In some embodiments, the vertically aligned carbon nanotubes of the present disclosure include pristine carbon nanotubes. In some embodiments, the pristine carbon nanotubes have little or no defects or impurities.

In some embodiments, the vertically aligned carbon nanotubes of the present disclosure include functionalized carbon nanotubes. In some embodiments, the functionalized carbon nanotubes include sidewall-functionalized carbon nanotubes. In some embodiments, the functionalized carbon nanotubes include one or more functionalizing agents. In some embodiments, the functionalizing agents include, without limitation, oxygen groups, hydroxyl groups, carboxyl groups, epoxide moieties, and combinations thereof.

In some embodiments, the sidewalls of the vertically aligned carbon nanotubes of the present disclosure contain structural defects, such as holes. In some embodiments, carbons at the edges of the structural defects (e.g., holes) are terminated by one or more of atoms or functional groups (e.g., hydrogen, oxygen groups, hydroxyl groups, carboxyl groups, epoxide moieties, and combinations thereof).

The vertically aligned carbon nanotubes of the present disclosure can be in various forms. For instance, in some embodiments, the vertically aligned carbon nanotubes are in the form of an array (e.g., array 35 in FIG. 1B). In some embodiments, the array is in the form of a carpet or a forest. In some embodiments, the array is in the form of superlattices held together by van der Waals interactions.

In some embodiments, the vertically aligned carbon nanotubes of the present disclosure are in the form of carbon nanotube bundles that include a plurality of channels. In some embodiments, the carbon nanotube bundles have inter-tube spacings ranging from about 3 Å to about 20 Å. In some embodiments, the carbon nanotube bundles have inter-tube spacings of about 3.4 Å. In some embodiments, the carbon nanotube bundles have channels with sizes that range from about 5 Å to about 20 Å. In some embodiments, the carbon nanotube bundles have channels with sizes of about 6 Å.

The vertically aligned carbon nanotubes of the present disclosure can have various angles. For instance, in some embodiments, the vertically aligned carbon nanotubes of the present disclosure have angles that range from about 45° to about 90°. In some embodiments, the vertically aligned carbon nanotubes of the present disclosure have angles that range from about 75° to about 90°. In some embodiments, the vertically aligned carbon nanotubes of the present disclosure have an angle of about 90°.

The vertically aligned carbon nanotubes of the present disclosure can also have various thicknesses. For instance, in some embodiments, the vertically aligned carbon nanotubes of the present disclosure have a thickness ranging from about 10 μm to about 2 mm. In some embodiments, the vertically aligned carbon nanotubes of the present disclosure have a thickness ranging from about 10 μm to about 1 mm. In some embodiments, the vertically aligned carbon nanotubes of the present disclosure have a thickness ranging from about 10 μm to about 500 μm. In some embodiments, the vertically aligned carbon nanotubes of the present disclosure have a thickness ranging from about 10 μm to about 100 μm. In some embodiments, the vertically aligned carbon nanotubes of the present disclosure have a thickness of about 50 μm.

Substrates

Figure 1B:
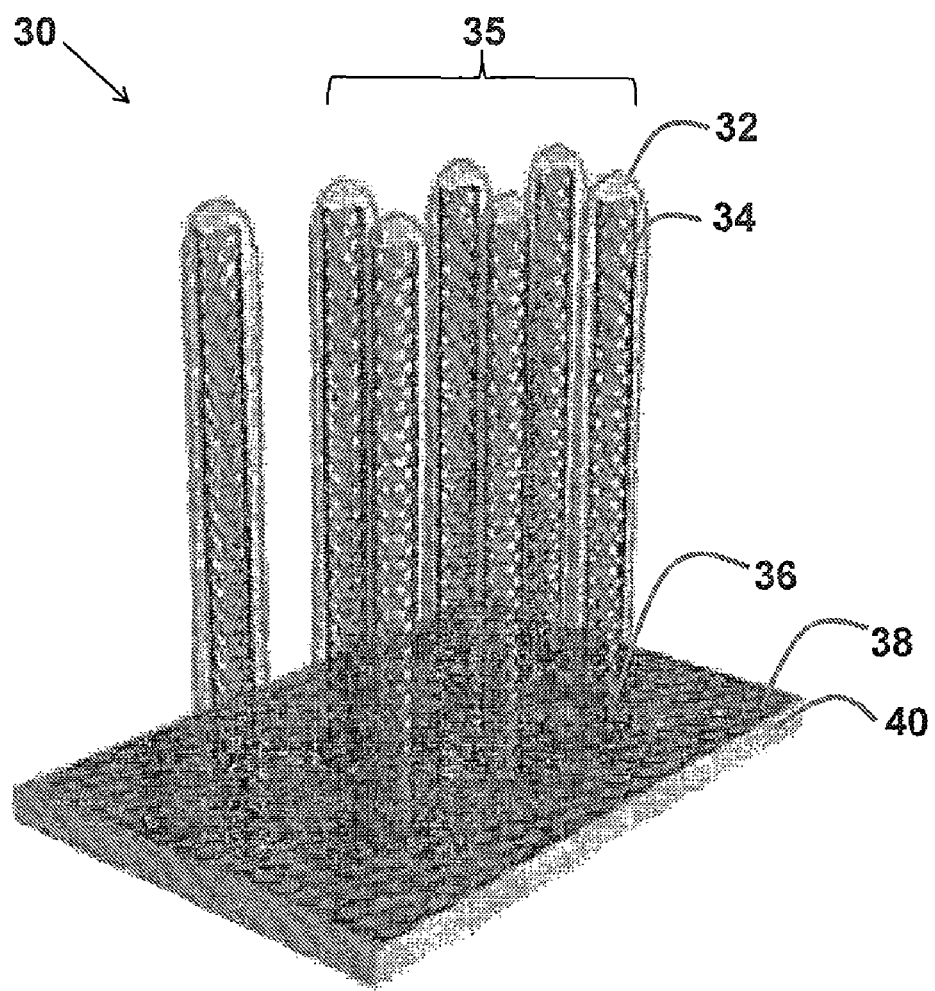
Figure 1C:
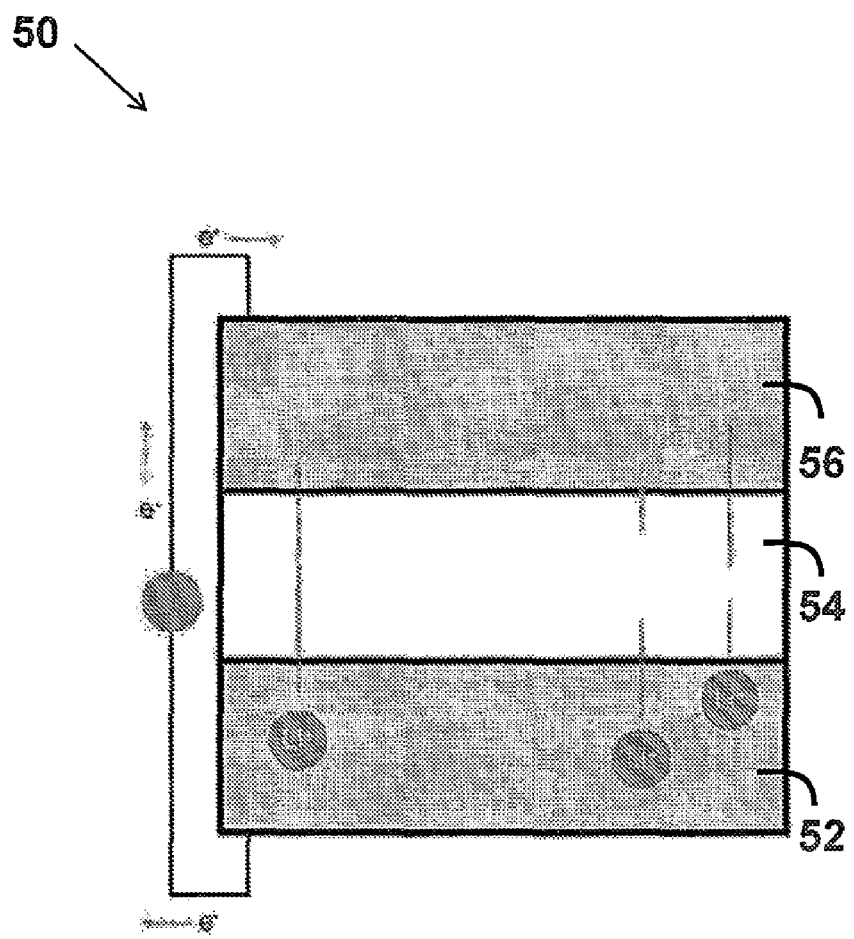

In some embodiments, the vertically aligned carbon nanotubes of the present disclosure may be associated with a substrate (e.g., substrate 40 in FIG. 1B). In some embodiments, the substrate also includes a graphene film (e.g., graphene film 38 in FIG. 1B). In some embodiments, the substrate serves as a current collector. In some embodiments, the substrate and the vertically aligned carbon nanotubes serve as a current collector.

Various substrates may be utilized in the electrodes of the present disclosure. For instance, in some embodiments, the substrate includes, without limitation, nickel, cobalt, iron, platinum, gold, aluminum, chromium, copper, magnesium, manganese, molybdenum, rhodium, ruthenium, silicon, tantalum, titanium, tungsten, uranium, vanadium, zirconium, silicon dioxide, aluminum oxide, boron nitride, carbon, carbon-based substrates, diamond, alloys thereof, and combinations thereof. In some embodiments, the substrate includes a copper substrate. In some embodiments, the substrate includes a nickel substrate.

In some embodiments, the substrate includes a carbon-based substrate. In some embodiments, the carbon-based substrate includes, without limitation, graphitic substrates, graphene, graphite, buckypapers (e.g., papers made by filtration of carbon nanotubes), carbon fibers, carbon fiber papers, carbon papers (e.g., carbon papers produced from graphene or carbon nanotubes), graphene papers (e.g., graphene papers made by filtration of graphene or graphene oxide with subsequent reduction), carbon films, metal carbides, silicon carbides, and combinations thereof.

The vertically aligned carbon nanotubes of the present disclosure may be associated with a substrate in various manners. For instance, in some embodiments, the vertically aligned carbon nanotubes of the present disclosure are covalently linked to the substrate. In some embodiments, the vertically aligned carbon nanotubes of the present disclosure are substantially perpendicular to the substrate. Additional arrangements can also be envisioned.

Graphene-carbon Nanotube Hybrid Materials

In some embodiments, the vertically aligned carbon nanotubes of the present disclosure are in the form of graphene-carbon nanotube hybrid materials. In some embodiments, the graphene-carbon nanotube hybrid materials include a graphene film (e.g., graphene film 38 in FIG. 1B) and vertically aligned carbon nanotubes covalently linked to the graphene film (e.g., vertically aligned carbon nanotubes 34 in FIG. 1B). In some embodiments, the vertically aligned carbon nanotubes are covalently linked to the graphene film through carbon-carbon bonds at one or more junctions between the carbon nanotubes and the graphene film (e.g., junction 36 in FIG. 1B). In some embodiments, the vertically aligned carbon nanotubes are in ohmic contact with a graphene film through the carbon-carbon bonds at the one or more junctions. In some embodiments, the one or more junctions include seven-membered carbon rings. In some embodiments, the one or more junctions are seamless.

In some embodiments, the graphene-carbon nanotube hybrid materials of the present disclosure can also include a substrate that is associated with the graphene film (e.g., substrate 40 in FIG. 1B). Suitable substrates were described previously. For instance, in some embodiments, the substrate can include a metal substrate, such as copper. In some embodiments, the substrate includes a carbon-based substrate, such as a graphitic substrate. In some embodiments, the carbon-based substrate can work both as a current collector and a carbon source for the growth of carbon nanotubes.

The graphene-carbon nanotube hybrid materials of the present disclosure can include various graphene films. For instance, in some embodiments, the graphene film includes, without limitation, monolayer graphene, few-layer graphene, double-layer graphene, triple-layer graphene, multi-layer graphene, graphene nanoribbons, graphene oxide, reduced graphene oxide, graphite, and combinations thereof.

In some embodiments, the graphene film includes reduced graphene oxide. In some embodiments, the graphene film includes graphite.

The vertically aligned carbon nanotubes of the present disclosure may also be associated with graphene films in various manners. For instance, in some embodiments, the vertically aligned carbon nanotubes are substantially perpendicular to the graphene film (e.g., vertically aligned carbon nanotubes 34 in FIG. 1B). In some embodiments, the vertically aligned carbon nanotubes of the present disclosure are associated with graphene films at angles that range from about 45° to about 90°.

The vertically aligned carbon nanotubes of the present disclosure can be prepared by various methods. For instance, in some embodiments, the vertically aligned carbon nanotubes of the present disclosure can be made by: (1) associating a graphene film with a substrate; (2) applying a catalyst and a carbon source to the graphene film; and (3) growing carbon nanotubes on the graphene film.

In some embodiments, catalysts may include a metal (e.g., iron) and a buffer (e.g., alumina). In some embodiments, the metal (e.g., iron) and buffer (e.g., alumina) can be grown from nanoparticles (e.g., iron alumina nanoparticles).

In some embodiments, the metal and buffer are sequentially deposited onto a graphene film by various methods, such as electron beam deposition. In some embodiments, various carbon sources (e.g., ethene or ethyne) may be deposited onto the graphene film by various methods, such as chemical vapor deposition. In some embodiments, the graphene film can be grown on a substrate from various carbon sources, such as gaseous or solid carbon sources.

Additional embodiments of graphene-carbon nanotube hybrid materials and methods of making the hybrid materials are described in an additional PCT application by Applicants, which has been published as WO 2013/119,295. The entirety of the aforementioned application is incorporated herein by reference.

Metals

The vertically aligned carbon nanotubes of the present disclosure may become associated with various metals. For instance, in some embodiments, the metals include, without limitation, alkali metals, alkaline earth metals, transition metals, post transition metals, rare-earth metals, and combinations thereof.

In some embodiments, the metals include alkali metals. In some embodiments, the alkali metals include, without limitation, Li, Na, K, and combinations thereof. In some embodiments, the metals include Li.

In some embodiments, the metals include alkaline earth metals. In some embodiments, the alkaline earth metals include, without limitation, Mg, Ca, and combinations thereof.

In some embodiments, the metals include transition metals. In some embodiments, the transition metals include, without limitation, Ti, V, Cr, Mn, Fe, Co, Ni, Cu, Zn, and combinations thereof.

In some embodiments, the metals include post transition metals. In some embodiments, the post transition metals include, without limitation, Al, Sn, Sb, Pb, and combinations thereof.

Application of Metals to Vertically Aligned Carbon Nanotubes

Various methods may be utilized to apply metals to vertically aligned carbon nanotubes. For instance, in some embodiments, the applying occurs by filtration, ultrafiltration, coating, spin coating, spraying, spray coating, patterning, mixing, blending, thermal activation, electro-deposition, electrochemical deposition, doctor-blade coating, screen printing, gravure printing, direct write printing, inkjet printing, mechanically pressing, melting, and combinations thereof. In some embodiments, the applying occurs by electrochemical deposition.

The application of metals to vertically aligned carbon nanotubes can occur at various times. For instance, in some embodiments, the applying occurs during electrode fabrication. In some embodiments, the applying occurs after electrode fabrication.

In some embodiments, the applying occurs in situ during electrode operation. For instance, in some embodiments, electrodes that contain the vertically aligned carbon nanotubes of the present disclosure are placed in an electric field that contains metals. Thereafter, the metals become associated with the vertically aligned carbon nanotubes during the application of the electric field.

In some embodiments, the applying occurs by melting a metal (e.g., a pure metal, such as lithium) over a surface of vertically aligned carbon nanotubes. Thereafter, the metals can become associated with the vertically aligned carbon nanotubes during the wetting of the vertically aligned carbon nanotubes by the liquid metal.

In some embodiments, the applying occurs by electro-depositing a metal (e.g., a pure metal or a metal-containing solid material, such as lithium or lithium-based materials) over a surface of vertically aligned carbon nanotubes. Thereafter, the metals can become associated with the vertically aligned carbon nanotubes during the electro-deposition. In some embodiments, the metal may be dissolved in an aqueous or organic electrolyte during electro-deposition.

Association of Metals with Vertically Aligned Carbon Nanotubes

The metals of the present disclosure can become associated with vertically aligned carbon nanotubes in various manners. For instance, as set forth previously, the metal can become associated with the vertically aligned carbon nanotubes in situ during electrode operation. In some embodiments, the metal can become reversibly associated with the vertically aligned carbon nanotubes. In some embodiments, the metal can become reversibly associated with the vertically aligned carbon nanotubes during electrode operation by association during charging and dissociation during discharging.

In some embodiments, the metals of the present disclosure can become associated with vertically aligned carbon nanotubes in a uniform manner. For instance, in some embodiments, the metal becomes associated with the vertically aligned carbon nanotubes without forming dendrites. In some embodiments, the metal becomes associated with the vertically aligned carbon nanotubes without forming aggregates (e.g., metal particulates or mossy aggregates).

The metals of the present disclosure can become associated with various regions of vertically aligned carbon nanotubes. For instance, in some embodiments, the metal becomes associated with surfaces of the vertically aligned carbon nanotubes. In some embodiments, the metal forms a non-dendritic or non-mossy coating on the surfaces of the vertically aligned carbon nanotubes. In some embodiments, the metal becomes infiltrated within the bundles of the vertically aligned carbon nanotubes.

In some embodiments, the metal becomes associated with the vertically aligned carbon nanotubes in the form of a film. In some embodiments, the film is on the surface of the vertically aligned carbon nanotubes (e.g., film 32 in FIG. 1B). Additional modes of associations can also be envisioned.

Electrode Structures and Properties

The electrodes of the present disclosure can have various structures. For instance, in some embodiments, the electrodes of the present disclosure are in the form of films, sheets, papers, mats, scrolls, conformal coatings, and combinations thereof. In some embodiments, the electrodes of the present disclosure have a three-dimensional structure.

The electrodes of the present disclosure can serve various functions. For instance, in some embodiments, the electrodes of the present disclosure can serve as an anode. In some embodiments, the electrodes of the present disclosure can serve as a cathode.

Different components of the electrodes of the present disclosure can serve various functions. For instance, in some embodiments, the vertically aligned carbon nanotubes serve as the active layer of the electrodes (e.g, active layers of cathodes and anodes). In other embodiments, the metals serve as the electrode active layer while vertically aligned carbon nanotubes serve as a current collector. In some embodiments, vertically aligned carbon nanotubes serve as a current collector in conjunction with a substrate (e.g., a copper substrate associated with a graphene film). In some embodiments, the vertically aligned carbon nanotubes of the present disclosure also serve to suppress dendrite formation.

In more specific embodiments, the graphene-carbon nanotube hybrid materials of the present disclosure serve as a current collector while the metal serves as an active material. In some embodiments, the graphene-carbon nanotube hybrid materials of the present disclosure serve as a current collector in conjunction with a substrate.

The electrodes of the present disclosure can have various advantageous properties. For instance, in some embodiments, the electrodes of the present disclosure have surface areas that are more than about 650 $m^2/g$. In some embodiments, the electrodes of the present disclosure have surface areas that are more than about 2,000 $m^2/g$. In some embodiments, the electrodes of the present disclosure have surface areas that range from about 2,000 $m^2/g$ to about 3,000 $m^2/g$. In some embodiments, the electrodes of the present disclosure have surface areas that range from about 2,000 $m^2/g$ to about 2,600 $m^2/g$. In some embodiments, the electrodes of the present disclosure have a surface area of about 2,600 $m^2/g$.

The electrodes of the present disclosure can also have high metal storage capacities. For instance, in some embodiments, the electrodes of the present disclosure have metal storage capacities that are more than about 50 wt %. In some embodiments, the electrodes of the present disclosure have metal storage capacities that range from about 75 wt % to about 2,000 wt %. In some embodiments, the electrodes of the present disclosure have metal storage capacities ranging from about 600 wt % to 700 wt %. In some embodiments, the electrodes of the present disclosure have metal storage capacities of about 650 wt %. In some embodiments, the aforementioned weight percentages are represented as the mass of deposited metal divided by the mass of the vertically aligned carbon nanotubes.

The electrodes of the present disclosure can also have high specific capacities. For instance, in some embodiments, the electrodes of the present disclosure have specific capacities of more than about 400 mAh/g. In some embodiments, the electrodes of the present disclosure have specific capacities of more than about 2,000 mAh/g. In some embodiments, the electrodes of the present disclosure have specific capacities ranging from about 1,000 mAh/g to about 4,000 mAh/g. In some embodiments, the electrodes of the present disclosure have specific capacities ranging from about 3,000 mAh/g to about 4,000 mAh/g. In some embodiments, the electrodes of the present disclosure have specific capacities ranging from about 3,500 mAh/g to about 3,900 mAh/g.

The electrodes of the present disclosure can also have high areal capacities. For instance, in some embodiments, the electrodes of the present disclosure have areal capacities ranging from about 0.1 mAh/cm$^2$ to about 20 mAh/cm$^2$. In some embodiments, the electrodes of the present disclosure have areal capacities ranging from about 0.4 mAh/cm$^2$ to about 4 mAh/cm$^2$. In some embodiments, the electrodes of the present disclosure have areal capacities of more than about 2 mAh/cm$^2$.

Incorporation Into Energy Storage Devices

The methods of the present disclosure can also include a step of incorporating the electrodes of the present disclosure as a component of an energy storage device. Additional embodiments of the present disclosure pertain to energy storage devices that contain the electrodes of the present disclosure.

The electrodes of the present disclosure can be utilized as components of various energy storage devices. For instance, in some embodiments, the energy storage device includes, without limitation, capacitors, batteries, photovoltaic devices, photovoltaic cells, transistors, current collectors, and combinations thereof.

In some embodiments, the energy storage device is a capacitor. In some embodiments, the capacitor includes, without limitation, lithium-ion capacitors, super capacitors, micro supercapacitors, pseudo capacitors, two-electrode electric double-layer capacitors (EDLC), and combinations thereof.

In some embodiments, the energy storage device is a battery (e.g., battery 50 in FIG. 1C). In some embodiments, the battery includes, without limitation, rechargeable batteries, non-rechargeable batteries, micro batteries, lithium-ion batteries, lithium-sulfur batteries, lithium-air batteries, sodium-ion batteries, sodium-sulfur batteries, sodium-air batteries, magnesium-ion batteries, magnesium-sulfur batteries, magnesium-air batteries, aluminum-ion batteries, aluminum-sulfur batteries, aluminum-air batteries, calcium-ion batteries, calcium-sulfur batteries, calcium-air batteries, zinc-ion batteries, zinc-sulfur batteries, zinc-air batteries, and combinations thereof. In some embodiments, the energy storage device is a lithium-ion battery.

The electrodes of the present disclosure can be utilized as various components of energy storage devices. For instance, in some embodiments, the electrodes of the present disclosure are utilized as a cathode in an energy storage device (e.g., cathode 52 in battery 50, as illustrated in FIG. 1C). In some embodiments, the electrodes of the present disclosure are utilized as anodes in an energy storage device (e.g., anode 56 in battery 50, as illustrated in FIG. 1C).

In some embodiments, the electrodes of the present disclosure include a graphene-carbon nanotube hybrid material that is utilized as an anode in an energy storage device. In some embodiments, the anodes of the present disclosure may be associated with various cathodes. For instance, in some embodiments, the cathode is a transition metal compound. In some embodiments, the transition metal compound includes, without limitation, $Li_xCoO_2$, $Li_xFePO_4$, $Li_xNiO_2$, $Li_xMnO_2$, $Li_aNi_bMn_cCo_dO_2$, $Li_aNi_bCo_cAl_dO_2$, NiO, NiOOH, and combinations thereof. In some embodiments, integers a,b,c,d, and x are more than 0 and less than 1.

In some embodiments, cathodes that are utilized along with the anodes of the present disclosure include sulfur. In some embodiments, the cathode includes oxygen, such as dioxygen, peroxide, superoxide, and combinations thereof. In some embodiments, the cathode contains metal oxides, such as metal peroxides, metal superoxides, metal hydroxides, and combinations thereof. In some embodiments, the cathode includes lithium cobalt oxide. In some embodiments, the cathode includes a sulfur/carbon black cathode.

In some embodiments, the electronic devices that contain the electrodes of the present disclosure may also contain electrolytes (e.g., electrolytes 54 in battery 50, as illustrated in FIG. 1C). In some embodiments, the electrolytes include, without limitation, non-aqueous solutions, aqueous solutions, salts, solvents, additives, composite materials, and combinations thereof. In some embodiments, the electrolytes include, without limitation, lithium hexafluorophosphate (LiPF6), lithium (trimethylfluorosulfonyl) imide (LITFSI), lithium (fluorosulfonyl) imide (LIFSI), lithium bis(oxalate)borate (LiBOB), hexamethylphosphoustriamide (HMPA), and combinations thereof. In some embodiments, the electrolytes are in the form of a composite material. In some embodiments, the electrolytes include solvents, such as ethylene carbonate, diethyl carbonate, dimethyl carbonate, ethyl methyl carbonate, 1,2-dimethoxyl methane, and combinations thereof.

The energy storage devices of the present disclosure can have various advantageous properties. For instance, in some embodiments, the energy storage devices of the present disclosure have high specific capacities. In some embodiments, the energy storage devices of the present disclosure have specific capacities of more than about 100 mAh/g. In some embodiments, the energy storage devices of the present disclosure have specific capacities ranging from about 100 mAh/g to about 2,000 mAh/g. In some embodiments, the energy storage devices of the present disclosure have specific capacities ranging from about 100 mAh/g to about 1,000 mAh/g. In some embodiments, the energy storage devices of the present disclosure have specific capacities of about 800 mAh/g.

The energy storage devices of the present disclosure can also have high energy densities. For instance, in some embodiments, the energy storage devices of the present disclosure have energy densities of more than about 300 Wh/kg. In some embodiments, the energy storage devices of the present disclosure have energy densities ranging from about 300 Wh/kg to about 3,000 Wh/kg. In some embodiments, the energy storage devices of the present disclosure have energy densities ranging from about 1,000 Wh/kg to about 2,000 Wh/ kg. In some embodiments, the energy storage devices of the present disclosure have energy densities of about 1,840 Wh/kg.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

EXAMPLE 1

Carbon Nanotube-based Electrodes for Lithium-ion Batteries

In this Example, Applicants report a seamless graphene-carbon nanotube (GCNT) electrode that is capable of reversibly storing large amounts of lithium (Li) metal with complete suppression of dendrite formation. The GCNT serves as a host material to insert and form Li as a thin coating over its high surface area (~2600 m$^2$ g$^{-1}$). With a Li storage capacity of up to 4 mAh cm$^{-2}$ (823 mAh cm$^{-3}$) and 25.3 Ah g$^{-1}$$_{G-CNT}$, the GCNT stores 6.6 times its weight in Li, which is 6.6 times greater than silicon (Si). The capabilities, reversibility, and dendrite-free nature of the GCNT bode well for its use as a model structure for metal-based anodes in secondary batteries.

Figure 2A:
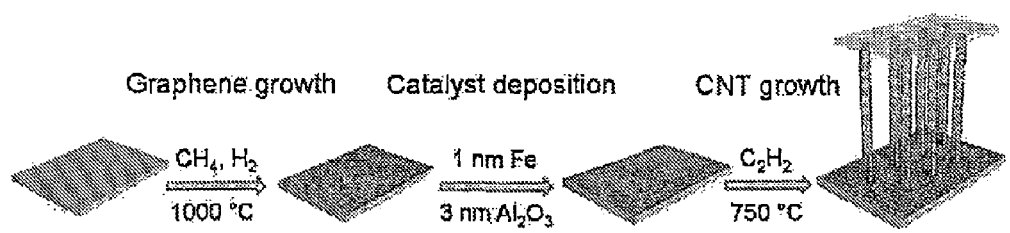
FIG. 2A provides a schematic of GCNT growth. E-beam deposited 1 nm iron nanoparticles were non-continuous and they served as the catalysts for the carbon nanotube (CNT) growth while a 3 nm layer of aluminum oxide provided the support for a vertical growth.

Graphene was first grown via chemical vapor deposition (CVD) on a copper (Cu) substrate, followed by deposition of iron nanoparticles and aluminum oxide and subsequent CVD growth of carbon nanotubes (CNTs) at 750° C. using acetylene as the carbon source (FIG. 2A). This method was previously shown by Applicants to produce CNTs that were covalently and seamlessly connected to the underlying graphene (FIG. 2B), providing ohmic conductance between Cu and CNTs. See WO 2013/119,295.

Figures 2B, 2C, 2D:
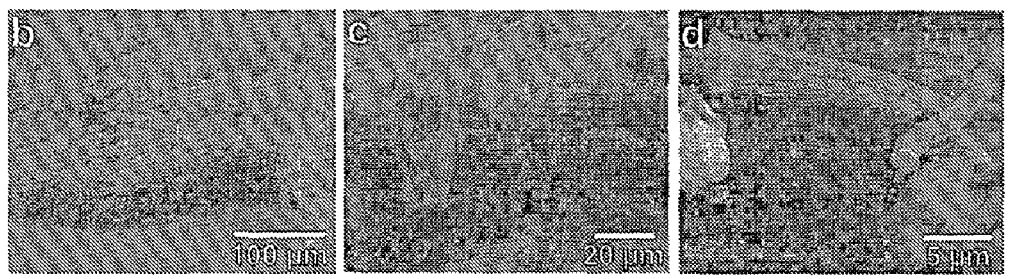
FIGS. 2B-D provide scanning electron microscopy (SEM) images of GCNT showing a CNT carpet grown vertically from a graphene-covered copper (Cu) substrate.
Figures 2E, 2F, 2G:
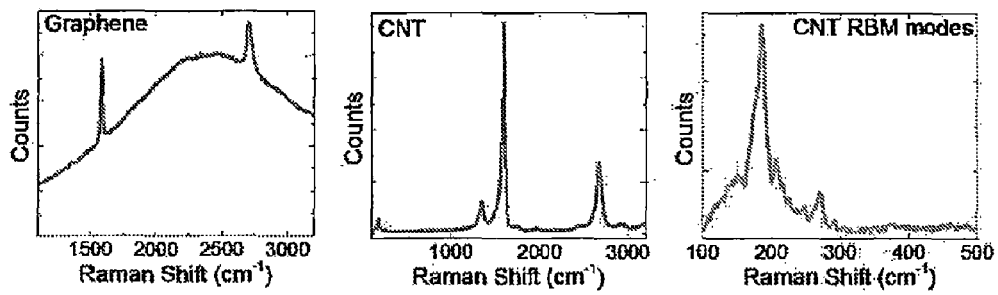
FIG. 2E shows a Raman spectrum of graphene as-grown on Cu. The graphene is conformally connected to its native Cu substrate upon which it is grown. The G band appears at 1589 $cm^{-1}$ while the 2D band appears at 2705 $cm^{-1}$ to provide an $I_G/I_{2D}$ ratio of more than 1. A trace D band appears at ~1360 $cm^{-1}$. The Raman scattering signatures signify a high quality multi-layer graphene. The skewed baseline occurred because the spectrum is obtained atop Cu.
FIG. 2F provides a Raman spectrum of CNTs grown on the Cu-graphene substrate with the G band at 1587 $cm^{-1}$, the 2D band at 2652 $cm^{-1}$, and the D band at 1336 $cm^{-1}$.
FIG. 2G provides a Raman radial breathing mode (RBM) spectrum of the CNTs in expanded format.

CNTs were grown vertically from the Cu-graphene substrate as a 50 μm thick carpet (FIG. 2B). They exist in bundles (FIGS. 2C-D), which are superlattices held together by van der Waals interactions. In addition to an inter-tube spacing of ~3.4 Å, the CNT bundles have 6 Å channels. The presence of formed CNTs were confirmed (FIG. 2F). In addition, the radial breathing modes (RBM) at 100 to 300 cm$^{-1}$ indicate single- to few-walled CNTs (FIG. 2G).

Figure 3A:
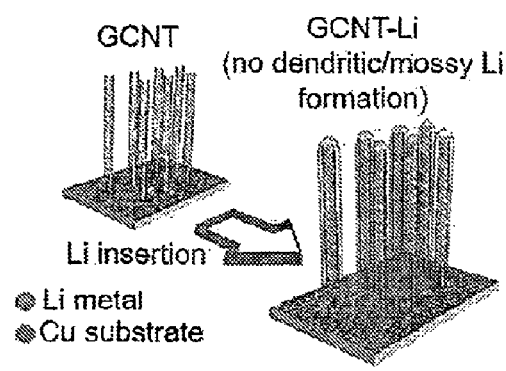
FIG. 3A provides a schematic of GCNT-Li formation.
Figure 3B:
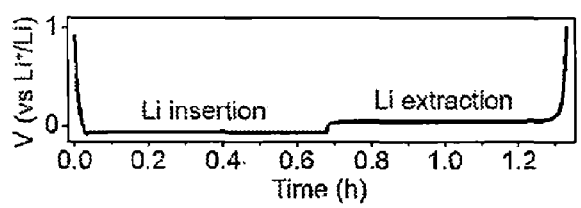
FIG. 3B provides voltage vs. time of lithiation and delithiation processes of GCNT-Li.
Figure 3C:
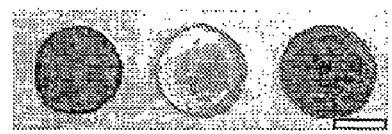
FIG. 3C provides a photograph of GCNTs, GCNT-Li, and delithiated GCNT-Li (scale bar corresponds to 1 cm). SEM images of GCNT-Li (0.7 mAh $cm^{-2}$ at 2 mA $cm^{-2}$) after 250 cycles are shown through a top-view (FIG. 3D), side-view (FIG. 3E), expanded top-view (FIG. 3F), and expanded side-view (FIG. 3G). SEM images of de-lithiated GCNT-Li are also shown through a top-view (FIG. 3H) and an expanded top-view (FIG. 3I). Transmission electron microscopy (TEM) images of a CNT from GCNT-Li (FIG. 3J) and its higher magnification (FIG. 3K) are also shown.

Li is inserted into the highly porous and high surface area GCNT, where the morphology of the CNTs induce formation of Li on the CNT surfaces as a film or non-dendritic coating (FIG. 3A), slightly below 0 V vs Li/Li$^+$ (FIG. 3B). Reversible Li insertion and extraction from the GCNT are observed (FIG. 3B). These are confirmed by GCNT color change from black to silver, indicating formation of Li metal (FIG. 3C), and back to black upon Li extraction.

Figures 3D, 3E, 3F, 3G:
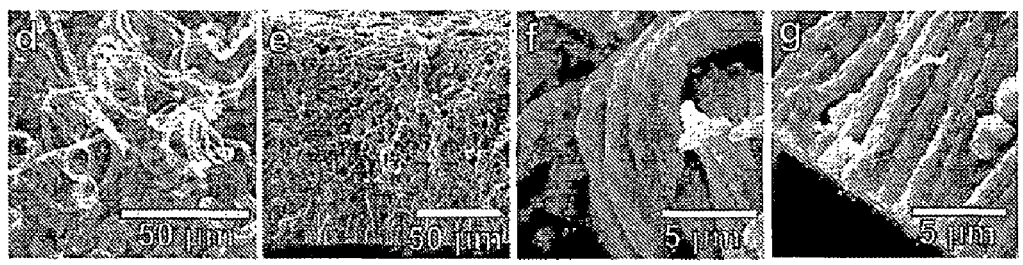
FIG. 3 illustrates the morphology of GCNT associated with lithium (GCNT-Li).
FIG. 3L shows a schematic of Li deposited on graphene grown on Cu.
FIG. 3M provides an SEM image of Li deposited directly on graphene grown on Cu foil (0.7 mAh $cm^{-2}$ at 2 mA $cm^{-2}$) without GCNT, showing the mossy and dendritic Li deposition, especially at higher magnification (FIG. 3N).

Scanning electron microscopy (SEM) images of the lithiated GCNT (GCNT-Li) (FIGS. 3D-E) show that Li is not deposited atop the GCNT as a separate film, but is rather inserted into the pillared CNT structure. The absence of Li aggregation or particulates deposited in the micrometer-sized pores of the GCNT-Li (FIG. 3F) suggests either Li formation on the surface of CNT bundles or penetration into the CNT bundles to form on individual CNTs. Moreover, the relatively rough surface of the CNT bundles shows the presence of a thin layer of film, clearly indicating that Li is formed on the CNT surfaces.

The base-view SEM image (FIG. 3G) also indicates a similarly rough surface of the CNT bundles and the presence of a deposited film, which underscores the significance of the micrometer-sized pores in Li ion diffusion through the GCNT. No discernable exfoliation of the CNT bundles in the delithiated GCNT (FIGS. 3H-I) is observed.

Figures 3H, 3I, 3J, 3K:
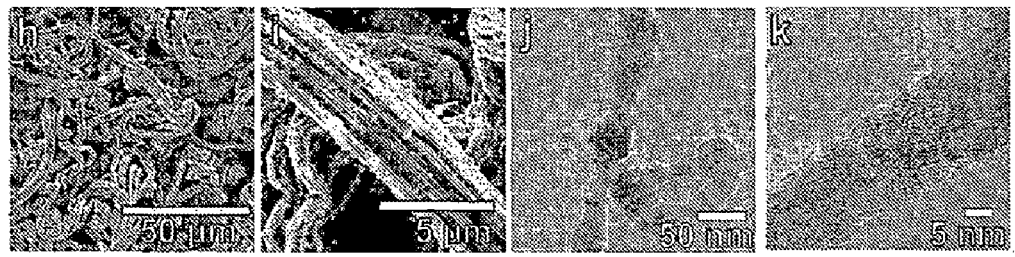

In FIGS. 3J-K, the transmission electron microscopy (TEM) images of the lithiated CNTs show deposition in the form of nanoparticles on the surface of the CNTs. The SEM images of the GCNT-Li presented in FIGS. 3D-I were recorded after 250 cycles and they show no evidence of formation of dendritic, mossy, and related structures that have hindered application of Li metal anodes.

Figure 3L:
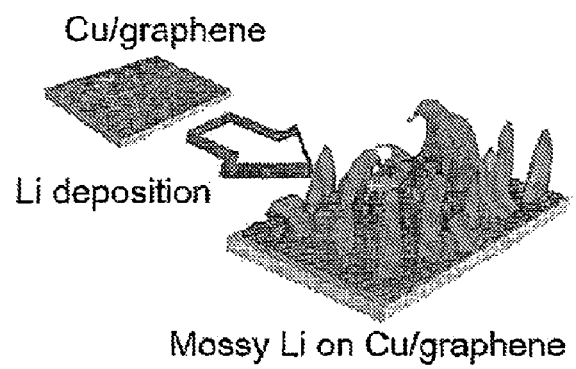
Figures 3M, 3N:
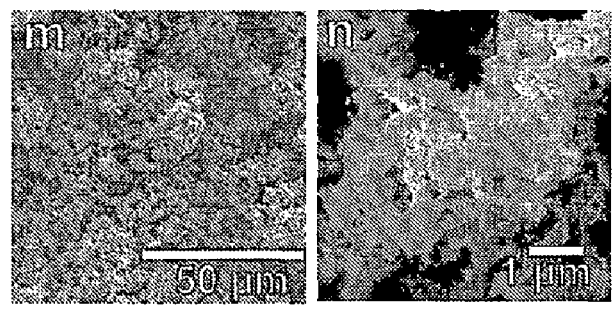

In contrast, deposition over flat substrates (graphene-covered copper foil, CuG) as shown in FIG. 3L produces irregular deposits of Li (FIGS. 3M-N). Mossy structures are observed in less than 10 cycles. In the three-dimensional, high surface area GCNT, there is enormous surface area for Li to deposit without dendritic/mossy Li formation. The porosity facilitates Li ion diffusion in and out of the GCNT.

Figure 4A:
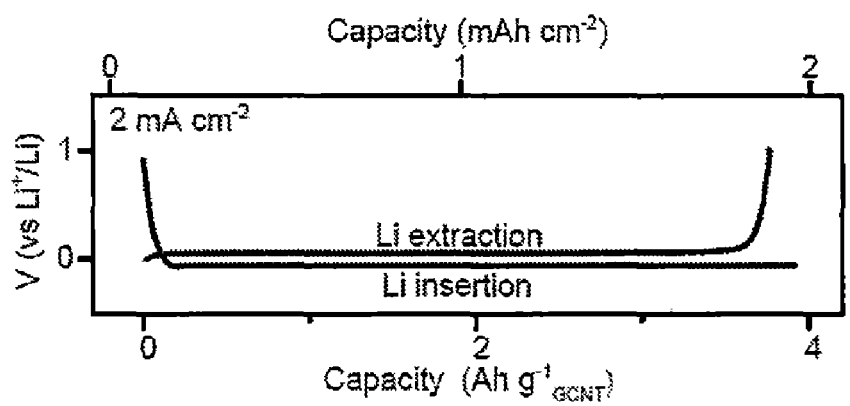
FIG. 4A shows the charge/discharge profile of GCNT-Li. Gravimetric capacity is based on the mass of GCNT, measured on a microbalance after CNT growth.
Figure 5:
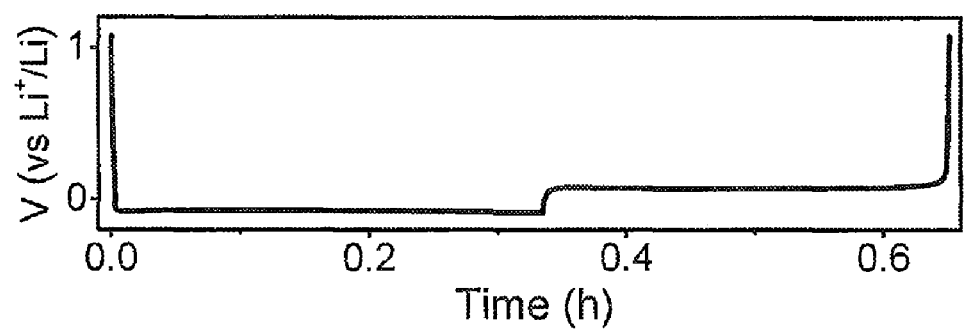
FIG. 5 shows the first cycle charge/discharge profile of Li metal deposited on copper-graphene (CuG) materials (CuG-Li).

FIG. 4A shows representative curves of the Li insertion and extraction from the 6th cycle. The discharge capacity of the GCNT-Li is 3920mAh g$^{-1}$ with a coulombic efficiency of 94.3%. An areal capacity of 2 mAh cm$^{-2}$ is obtained from 50 μm thick GCNT. The first cycle coulombic efficiency is ~60%. The discharge and charge curves are characterized by remarkably flat voltages at −50 mV and 50 mV, respectively (FIG. 4A). The voltage profile of the GCNT-Li resembles that of Li metal directly plated on a current collector, having a characteristic flat charge/discharge profile close to 0 V (FIG. 5).

Figure 4B:
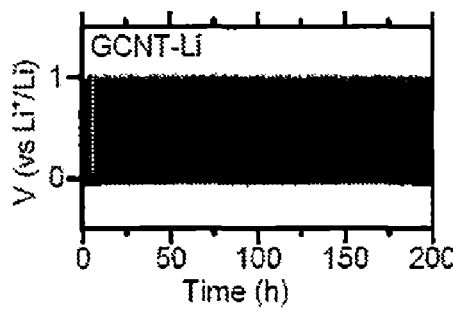
FIG. 4B shows a voltage profile of GCNT over 200 hours, corresponding to 300 charge-discharge cycles.
Figure 6:
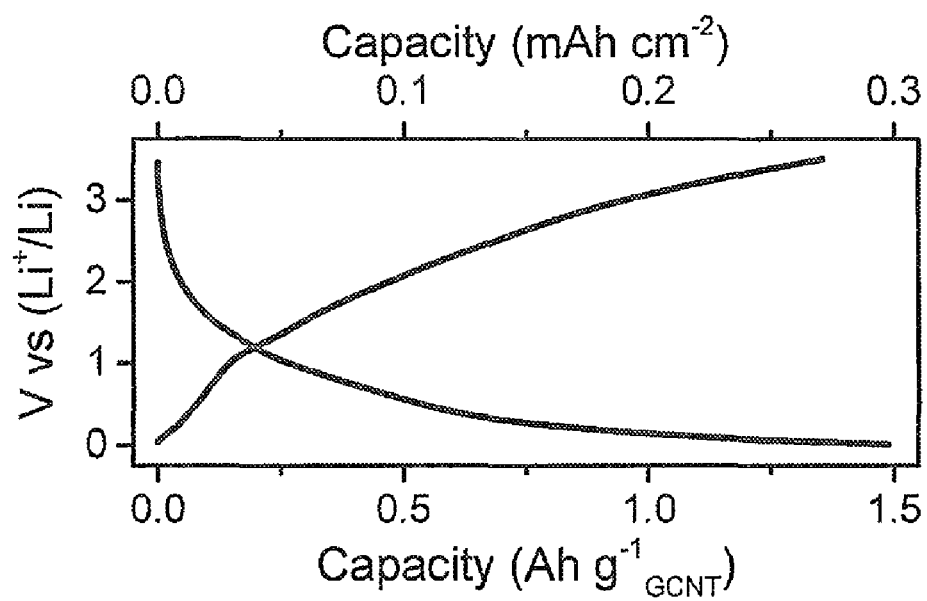
FIG. 6 shows the charge/discharge profile of GCNT-Li.
Figure 7:
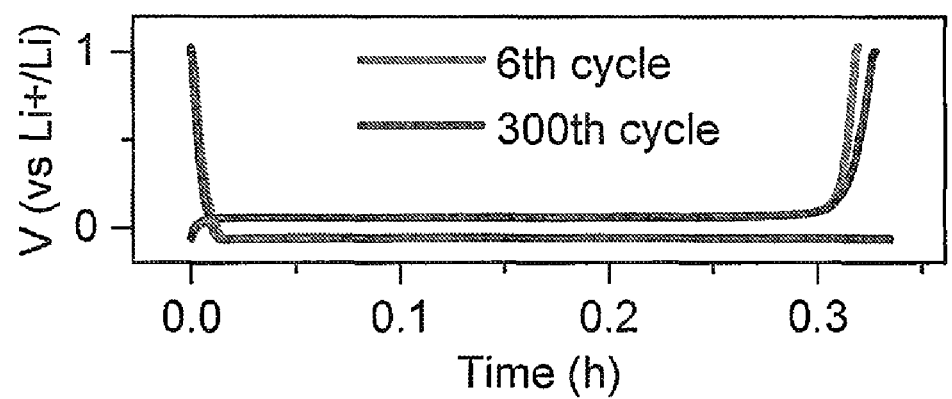
FIG. 7 shows the voltage characteristics of GCNT-Li anodes. Charge/discharge voltage profiles of GCNT-Li for the 6th and 300th cycles are shown. The slightly higher Li extraction time for the 300th cycle corresponds to a slightly higher capacity and increased coulombic efficiency of 99.83% compared to 94.3% for the 6th cycle. The current density is 2 mA cm$^{-2}$(12 A g$^{-1}$$_{GCNT}$).

It is evident that the inserted Li in the GCNT is metallic in contrast with Li-intercalated graphite where the Li forms a well-defined intercalation compound (LiC$_6$) with graphite and exists as an ion. Additionally, previously reported insertion of Li into CNTs have had limited promise toward developing practical LIBs because the voltage profile was not flat and the electrode needed to be charged above 3 V to reversibly extract much of the inserted Li (FIG. 6). The flat voltage here is observed over 200 hours of continuous cycling (300 cycles) (FIGS. 4B and 7).

Figure 4C:
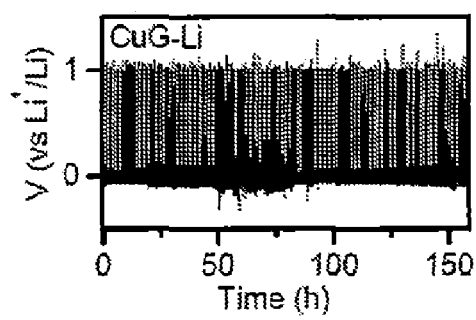
FIG. 4C provides a voltage profile of Cu-Li over 160 hours, corresponding to 250 charge-discharge cycles.
Figure 4D:
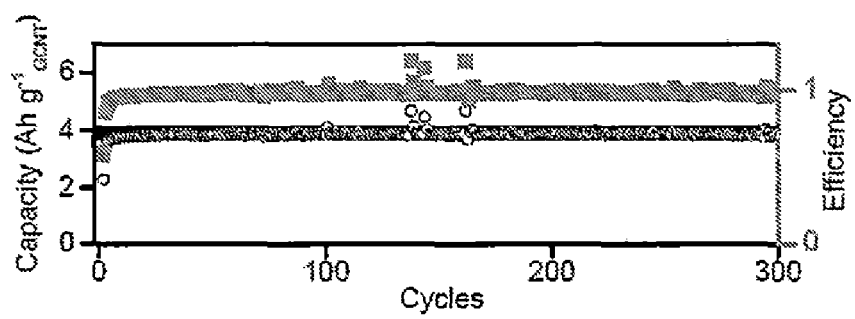
FIG. 4D provides cycle performance and coulombic efficiency of GCNT-Li. The current density is 2 mA cm$^{-2}$(12 A g$^{-1}$$_{GCNT}$).

In comparison, Li deposited directly on Cu-graphene shows oscillating coulombic efficiency and increased polarization (FIG. 4C), in addition to the problematic morphology of Li formed on the bare Cu-graphene substrate (FIGS. 3L-N). After 300 cycles, there is no capacity fading, and the coulombic efficiency is 99.83% (FIG. 4D). The concentrated electrolyte, 4 M lithium bis(fluorosulfonyl)imide in 1,2-dimethoxyethane, was reported to promote high coulombic efficiency in Li metal anodes due to decreased reactive solvent amount and increased Li$^+$ concentration.

Figure 8A:
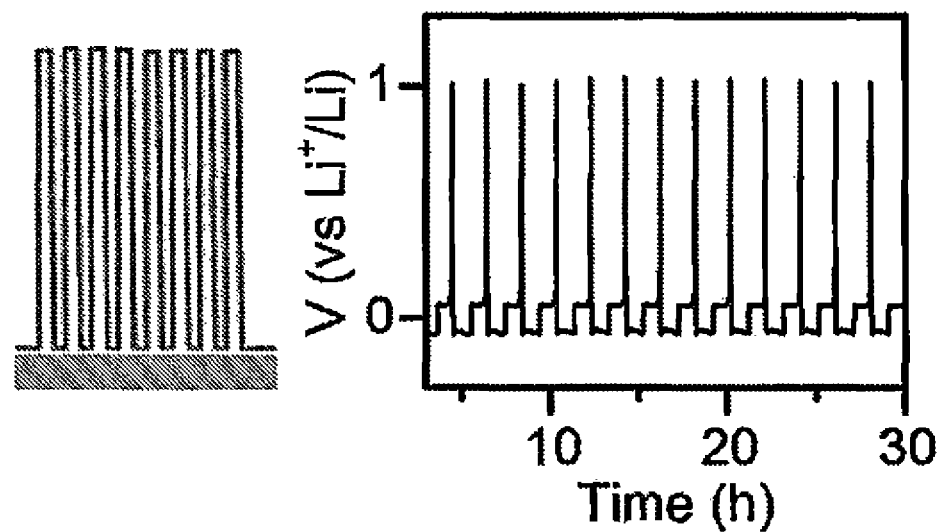
FIG. 8A shows the schematics and voltage profiles of vertical and seamless GCNT grown on Cu.
Figure 8B:
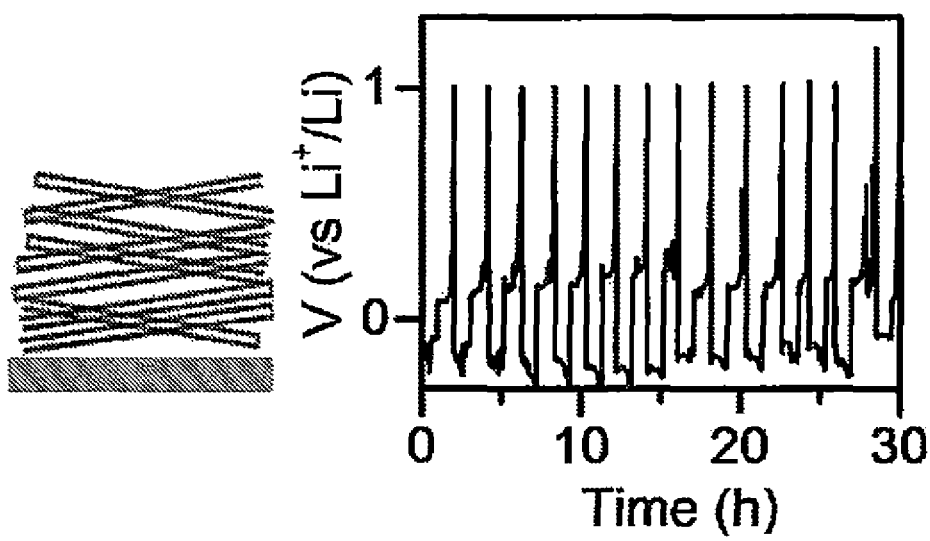
FIG. 8B shows the schematics and voltage profiles of horizontal CNT deposited on graphene-covered Cu.

A control experiment was carried out to compare the seamless monolithic GCNT grown on Cu relative to CNTs randomly dispersed on Cu. While the GCNT maintains a flat voltage profile over many cycles, the horizontally deposited CNT exhibits oscillating, unstable voltage cycles (FIGS. 8A-B and 9).

Figure 9A:
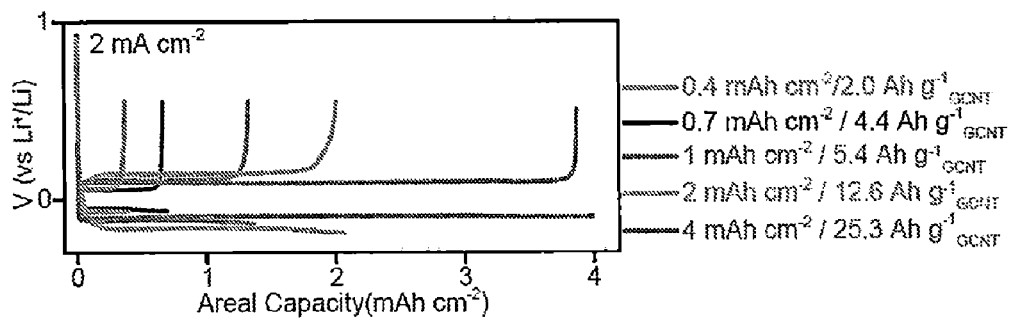
FIG. 9A shows the Li storage capacities of GCNTs from 0.4 to 4 mAh cm$^{-2}$. Comparison of the gravimetric capacity of GCNTs with other anode materials with respect to the mass of the anode (FIG. 9B) and the mass of the anode and Li inserted (FIG. 9C) are also shown. The areal capacities of GCNT-Li from 0.4 to 4 mAh cm$^{-2}$ are represented by GCNT-Li-0.4 to GCNT-Li-4.
Figure 9B:
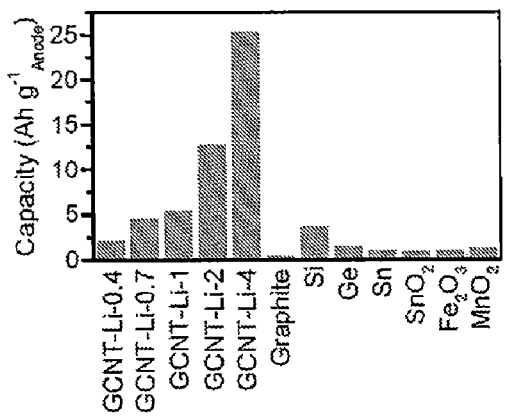
FIG. 9 shows data relating to Li storage and rate capabilities of GCNT-Li anodes.
FIG. 9D shows the charge-discharge profiles measured at different current densities expressed in current density per area and per mass of electrode.
FIG. 9E shows the cycle performance of GCNT-Li measured at different current densities.
Figure 10:
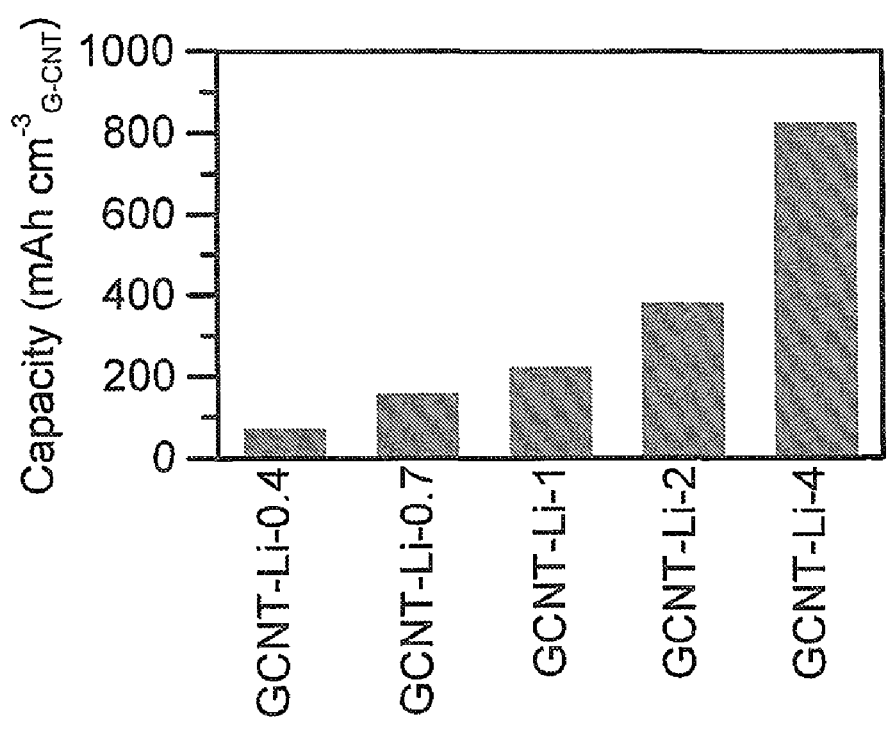
FIG. 10 shows the volumetric capacities of GCNT-Li anodes with areal capacity from 0.4 to 4 mAh cm$^{-2}$. Despite the very low density of GCNTs (35 mg/cm$^3$), the GCNT is capable of storing large amounts of Li on the surfaces of the CNTs without Li particulate formation in the large (micrometer-scale) pores of the material.

The specific capacity of the GCNT-Li is tunable by a time-controlled constant current Li insertion up to 4 mAh cm$^{-2}$ (25.3 Ah g$^{-1}$$_{G-CNT}$) (FIG. 9A). GCNT-Li electrodes with capacities from 0.4 to 4 mAh cm$^{-2}$ (2 to 25.3 Ah g$^{-1}$$_{G-CNT}$) are shown with flat voltage profiles and dendrite-free Li insertion (FIGS. 9A and 10). The large areal capacity demonstrates the high volumetric capacity (FIG. 10). A small voltage gap of 100 mV between the Li insertion and extraction curves is observed for 0.7 mAh cm$^{-2}$(4.4 Ah g$^{-1}$$_{G-CNT}$), increasing to 200 mV at 4 mAh cm$^{-2}$(25.3 Ah g$^{-1}$$_{G-CNT}$), likely due to the thicker inserted Li or possible thicker solid electrolyte interphase (SEI) layer.

Figure 9C:
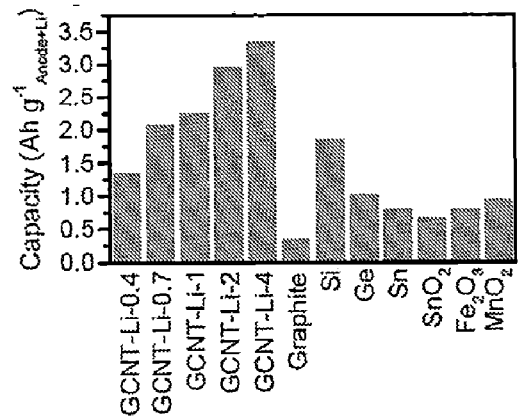

With a capacity of 25.3 Ah g$^{-1}$$_{G-CNT}$ (FIG. 9B), the GCNT stores 6.6 times its weight in Li, 68 times greater than does graphite (372 mAh g$^{-1}$$_C$), and 6.6 times greater than does Si (3859 mAh g$^{-1}$$_{Si}$). The capacity also exceeds other Li storage materials. With the mass of Li included in computing the capacity, the GCNT-Li has a capacity of 3351 mAh g$^{-1}$ $_{GCNT-Li}$, which is very close to the theoretical capacity of Li (3860 mAh g$^-$$_{LiC6}$). In this regard, the GCNT-Li (3351 mAh g$^{-1}$$_{GCNT+Li}$) has 1.8 times higher Li content than Li$_{15}$Si$_4$ (1857 mAh g$^{-1}$$_{Li15Si4}$), and 9.9 times higher Li content than LiC$_6$ (339 mAh g$^-$$_{LiC6}$) (FIG. 9C).

Figure 9D:
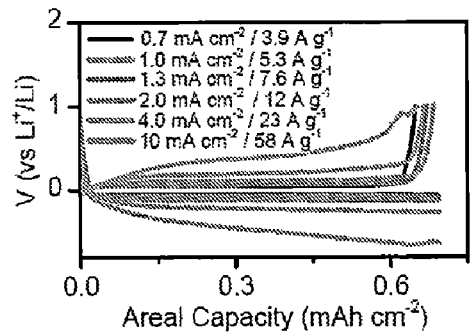

The GCNT-Li electrode exhibits high specific capacity, both areal and gravimetric, under increased current densities. In FIG. 9D, the GCNT is shown to insert and extract Li to a rate as high as 10 mA cm$^{-2}$ (58 A g$^{-1}$$_{G-CNT}$), producing a capacity of ~0.7 mAh cm$^{-2}$ (4.4 Ah g$^{-1}$$_{G-CNT}$), which is independent of the current density. The flatness of the curves is still maintained up to 4 mA cm$^{-2}$ (23 A g$^{-1}$$_{G-CNT}$). However, during the GCNT-Li cycling at 10 mA cm$^{-2}$ (58 A g$^{-1}$), a significant polarization is observed from the Li insertion/extraction curves with loss of the characteristic flatness at lower current densities.

Figure 9E:
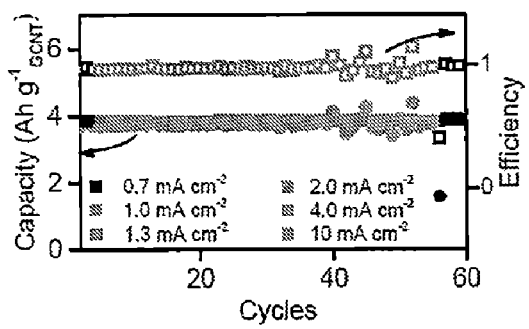

As shown in FIG. 9E, the GCNT-Li maintains a very high coulombic efficiency and good cycle stability at high current densities. The high current capability supersedes values reported on other LIB electrodes. Moreover, the optimal electrical conductivity of the GCNT monolith facilitates electron transport without the need for conductive additives. The seamless growth of CNTs on graphene, where the graphene is grown in intimate contact with the Cu, eliminates the electrode-current collector resistance. The vertical carpet nature of the CNTs would enhance Li-ion diffusion through non-tortuous Li insertion and extraction with flexible CNT movements.

Figure 11A:
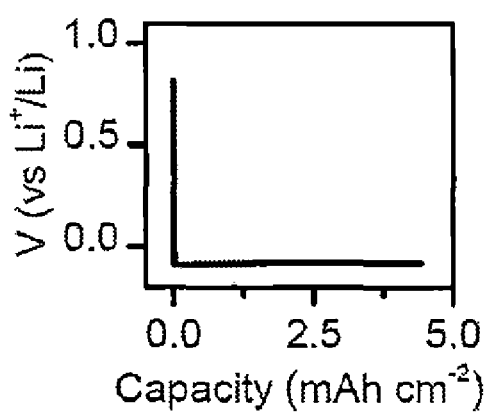
FIG. 11A shows the voltage profile of GCNTs during Li insertion.
Figure 11B:
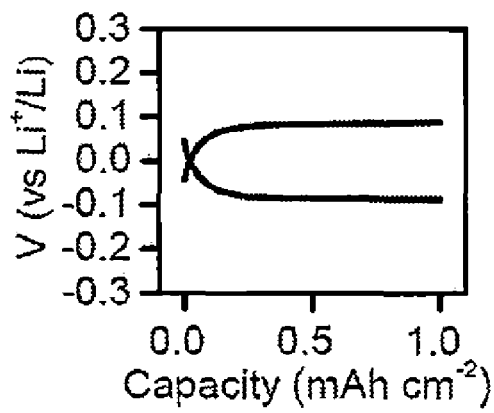
FIG. 11B shows the voltage profile of GCNTs during Li extraction followed by Li insertion up to 1 mAh cm$^{-2}$. The excess Li remains in the GCNT.
Figure 11C:
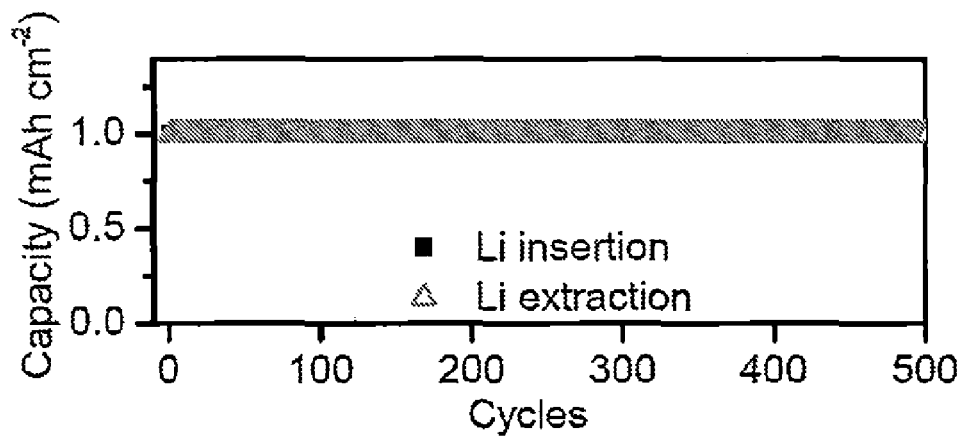
FIG. 11C shows cycle performance of GCNT-Li with excess Li.
Figure 11D:
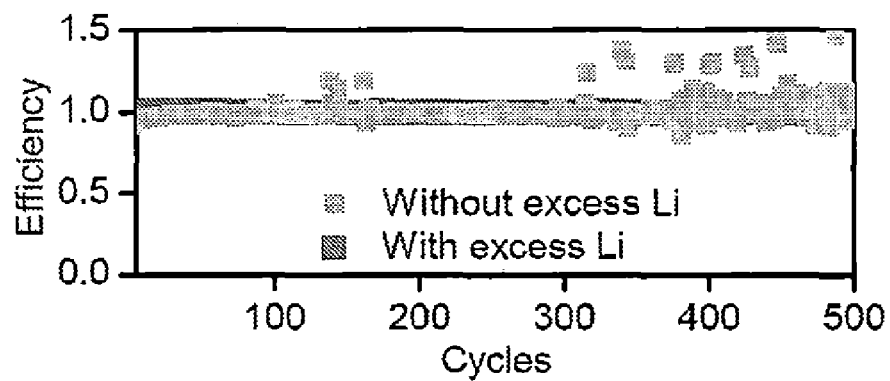
FIG. 11D shows coulombic efficiency of GCNT-Li with and without excess Li.

In a further experiment, excess Li was inserted into the GCNT until 5 mAh cm$^{-2}$ was attained (FIG. 11A). The electrode was then delithiated and lithiated for 5 cycles to stabilize the coulombic efficiency. The GCNT-Li was then allowed to undergo Li insertion/extraction cycles up to a capacity of 1 mAh cm$^{-2}$ (FIG. 11B), yielding an excess Li equivalent of 4 mAh cm$^{-2}$. This significantly improved the cycle life of the electrode with no sign of decline after 500 cycles and a coulombic efficiency of 100% (FIGS. 11C-D).

Figure 12:
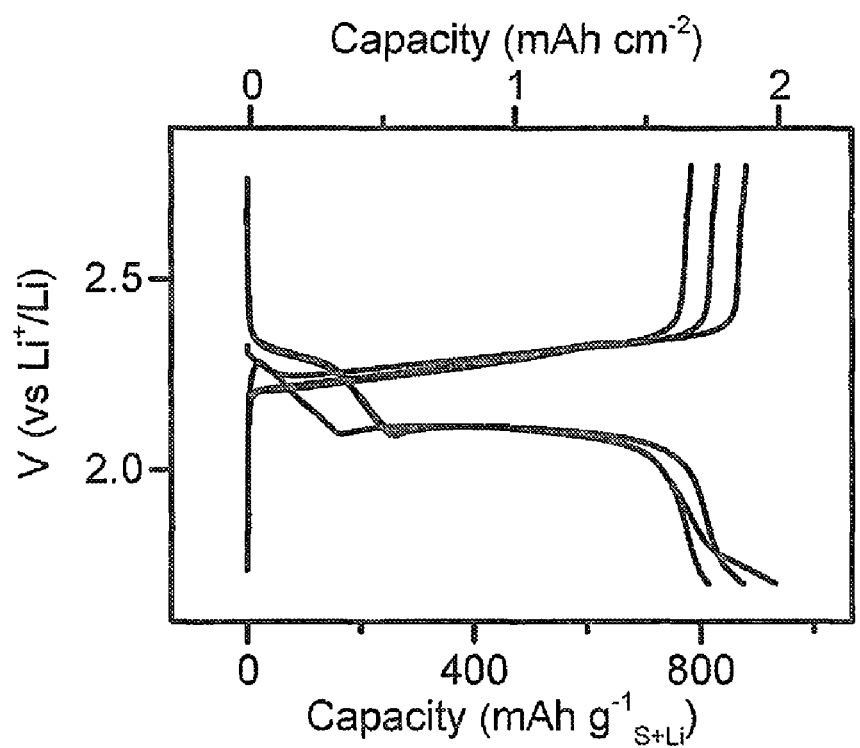
FIG. 12 shows the electrochemical performance of a full battery that contains GCNT-Li as the anode and sulfur/carbon black as the cathode. The charge-discharge profiles of the first three cycles of the battery were measured. The electrochemical performance of the battery is expressed in terms of gravimetric capacity (mass of S and mass of inserted Li). The two plateau are related to high order and low order lithium polysulfide (Li$_x$S$_y$) formation.

In addition, the GCNT-Li anode was combined with a sulfur cathode to produce a full Li-sulfur battery. The areal capacity of the GCNT-Li was matched with that of the sulfur cathode. As shown in FIG. 12, the two characteristic plateaus of sulfur lithiation appear at 2.3 and 2.1 V. The resulting sulfur lithiation products (lithium polysulfides) are known to diminish the cycle life of Li-sulfur batteries because they react with the Li metal anode, such as those inserted in the GCNT-Li.

Thus, a layer of graphene nanoribbons was deposited on the separator to restrain the polysulfides to the cathodic side, thereby improving the stability of the battery. Additionally, a small voltage gap of 190 mV between the charge and discharge of the full-cell is observed. The battery delivers a specific capacity of 800 mAh g$^{-1}$ (2 mAh cm$^{-2}$), which far exceeds the theoretical capacity of ~100mAh g$^{-1}$ in a graphite/LiCoO$_2$ system. This high capacity, despite the relatively low voltage feature of the sulfur cathode, enables a full battery with a high energy density of ~1840 Wh kg$^{-1}$, more than 6 times higher than 300 Wh kg$^{-1}$ for graphite/LiCoO2 cells.

Figure 13:
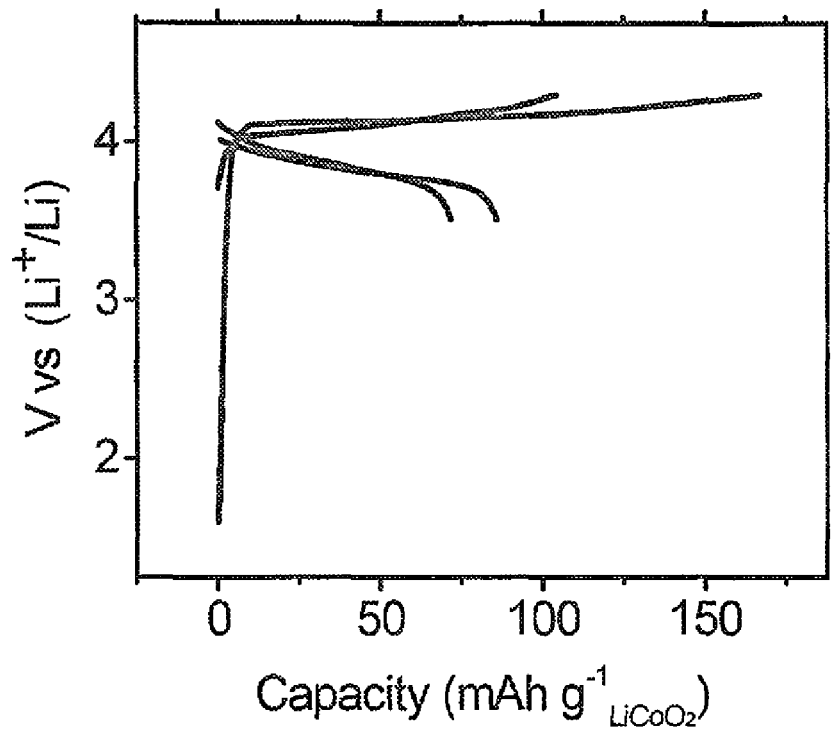
FIG. 13 shows the electrochemical performance of a full battery that contains GCNT-Li as the anode and lithium cobalt oxide (LiCoO$_2$) as the cathode. The charge-discharge profiles of the first two cycles of the full battery were measured.

In addition, a full battery made from GCNT-Li and LiCoO2 is demonstrated (FIG. 13). The gravimetric energy density is 310 Wh kg$^{-1}$ for the first cycle discharge.

EXAMPLE 1.1

GCNT Preparation

The preparation of GCNT was similar to the previously reported methods. See WO 2013/119295. First, Bernal-stacked multilayer graphene was grown on copper foil (25 μm) using the CVD method, as reported elsewhere. The catalysts for CNT growth were deposited by e-beam evaporation over the graphene/Cu foil to form graphene/Fe (1 nm)/Al$_2$O$_3$ (3 nm). The CNT growth was conducted under reduced pressure using a water-assisted CVD method at 750° C. First, the catalyst was activated by using atomic hydrogen (H.) generated in situ by H$_2$ decomposition on the surface of a hot filament (0.25 mm W wire, 10 A, 30 W) for 30 seconds under 25 Torr (210 sccm H$_2$, 2 sccm C$_2$H$_2$ and water vapor generated by bubbling 200 sccm of H$_2$ through ultra-pure water). After the activation of the catalyst for 30 seconds, the pressure was reduced to 8.3 Torr and the growth was carried out for 15 minutes.

EXAMPLE 1.2

Electrochemical Insertion (and Extraction) of Li Into GCNT

The electrochemical reaction was performed in 2032 coin-type cells using GCNT substrates and Li foil as both counter and reference electrodes. The GCNT substrates are circular with total area of ~2 cm$^2$. The electrolyte used was 4 M lithium bis(fluorosulfonyl)imide (LiFSI) (Oakwood Inc.) in 1,2-dimethoxyethane (DME). The LiFSI salt was vacuum dried (<20 Torr) at 100° C. for 24 hours and DME was distilled over Na strips. All the experiments were conducted inside a glove box with oxygen levels below 5 ppm. The separator was Celgard membranes K2045.

Previous to the coin cell assembly, the GCNT substrate was prelithiated by putting one drop of electrolyte on the surface of GCNT, pressing a Li coin gently against the GCNT and leaving it with the Li coin on top for 3 hours. Adding excessive amounts of the electrolyte solution during the pretreatment was found to yield ineffective prelithiation due to poor contact between the GCNT and the Li. After the prelithiation, the GCNT was assembled in a coin cell using the same Li chip used in the prelithiation. The current density for the electrochemical measurements (insertion/extraction and cycling) ranges from 1 to 10 mA cm$^{-2}$, all performed at room temperature. For the Li plating (discharging process), a time-controlled process with a constant current regime was applied with no cut-off voltage limit. The stripping process (charge process) was set to a constant current regime with a cut-off voltage of 1 V (vs Li$^+$/Li). A control experiment was carried out using a copper foil upon which graphene is grown by CVD.

EXAMPLE 1.3

Materials Characterization

Coin cells were dissembled inside a glove box to check the morphology of the GCNT electrodes after Li insertion/extraction. SEM images of the GCNT electrodes were obtained with an FE-SEM (JEOL-6500F) at an accelerating voltage of 20 kV. High resolution TEM (HRTEM) images (JEOL FEG-2100F) were obtained after preparing the samples by sonicating the GCNT substrate in acetonitrile and dropping the dispersion over TEM grids.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A lithium-metal battery comprising:
   a cathode;
   an electrolyte in contact with the cathode; and
   an anode in contact with the electrolyte opposite the cathode, the anode including:
   carbon nanotubes; and
   a metallic-lithium coating over and between the carbon nanotubes.

2. The lithium-metal battery of claim 1, the carbon nanotubes and the metallic-lithium coating over and between the carbon nanotubes having a lithium content greater than 339 mAh per combined gram of metallic-lithium and carbon content.

3. The lithium-metal battery of claim 2, the carbon nanotubes and the metallic-lithium coating over and between the carbon nanotubes having lithium content greater than 1,857 mAh per combined gram of metallic-lithium and carbon content.

4. The lithium-metal battery of claim 1, wherein an amount of the metallic lithium is a function of a charge of the lithium-metal battery.

5. The lithium-metal battery of claim 1, the cathode comprising sulfur.

6. The lithium-metal battery of claim 5, further comprising at least one layer of graphene between the cathode and the anode.

7. The lithium-metal battery of claim 6, the layer of graphene comprising graphene nanoribbons.

8. The lithium-metal battery of claim 1, further comprising a substrate supporting the carbon nanotubes opposite the metallic-lithium coating.

9. The lithium-metal battery of claim 8, further comprising a graphene layer between the substrate and the carbon nanotubes.

10. The lithium-metal battery of claim 9, wherein the carbon nanotubes are in ohmic contact with the graphene layer.

11. The lithium-metal battery of claim 1, wherein the electrolyte has concentrated lithium salts.

12. The lithium-metal battery of claim 11, wherein the electrolyte has a lithium concentration of 4 mol $L^{-1}$.

13. The lithium-metal battery of claim 1, the anode having a specific capacity greater than 1,000 mAh/g.

14. An electrode comprising:
    a substrate;
    graphene overlaying the substrate;
    carbon nanotubes extending from and in ohmic contact with the graphene; and
    a non-dendritic coating of a metal over and between the carbon nanotubes.

15. The electrode of claim 14, wherein the metal comprises lithium.

16. The electrode of claim 14, wherein the substrate comprises copper.

17. The electrode of claim 14, wherein the metal consists essentially of lithium.

18. The electrode of claim 14, wherein the carbon nanotubes are aligned.

19. The electrode of claim 14, wherein the carbon nanotubes are in a form of an array.

20. The electrode of claim 14, wherein the carbon nanotubes are in the form of random networks.

21. The electrode of claim 14, wherein the graphene comprises graphene nanoribbons.

22. The electrode of claim 14, wherein the non-dendritic coating lacks mossy aggregates.

23. The electrode of claim 14, wherein the non-dendritic coating is infiltrated within bundles of the carbon nanotubes.

24. The electrode of claim 14, wherein the electrode is an anode, the non-dendritic coating formed by depositing metal ions from a cathode to the anode.

25. An electrode comprising:
    a carbon-based substrate, wherein the carbon-based substrate is selected from the group consisting of a network of graphitic substrates, carbon fibers, graphene, graphene nanoribbons, carbon nanotubes, and combinations thereof;
    carbon nanotubes extending from and in ohmic contact with the carbon-based substrate; and
    a non-dendritic coating of a metal over and between the carbon nanotubes that are extending from and in ohmic contact with the carbon-based substrate.

* * * * *